Dec. 10, 1929.    R. C. BAKER    1,738,937
COMBINATION FISHING TOOL
Filed April 18, 1928    4 Sheets-Sheet 1
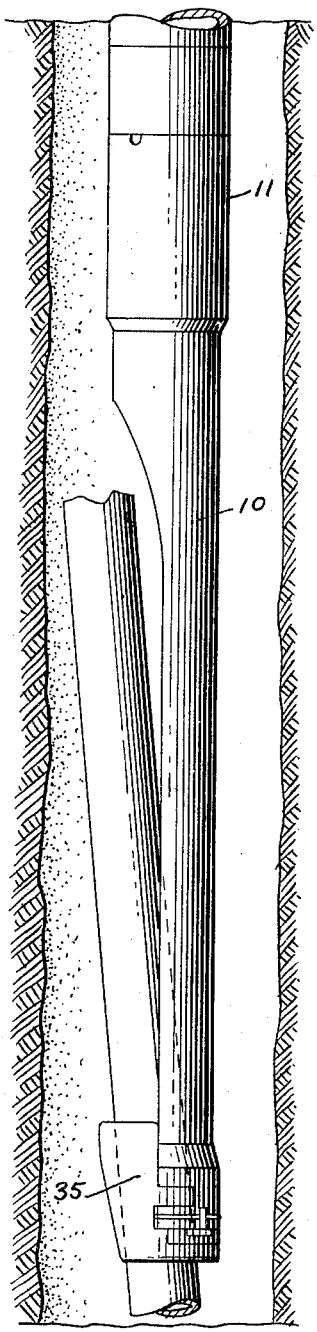
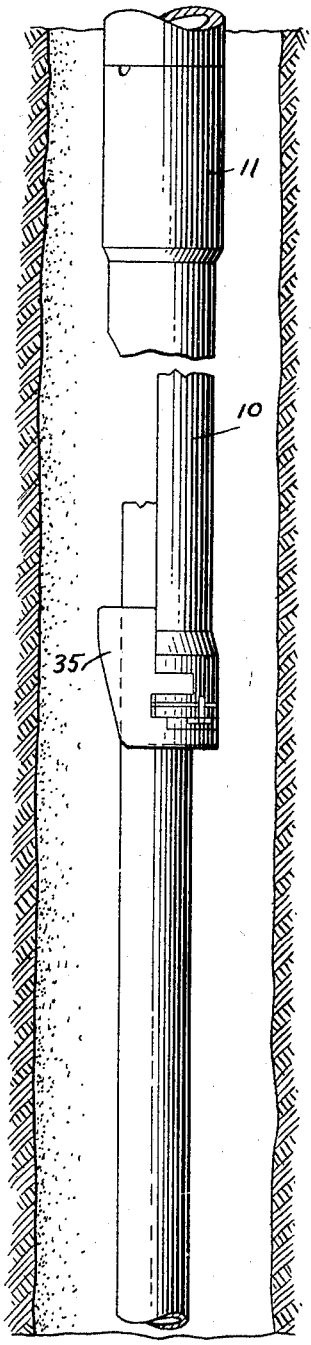
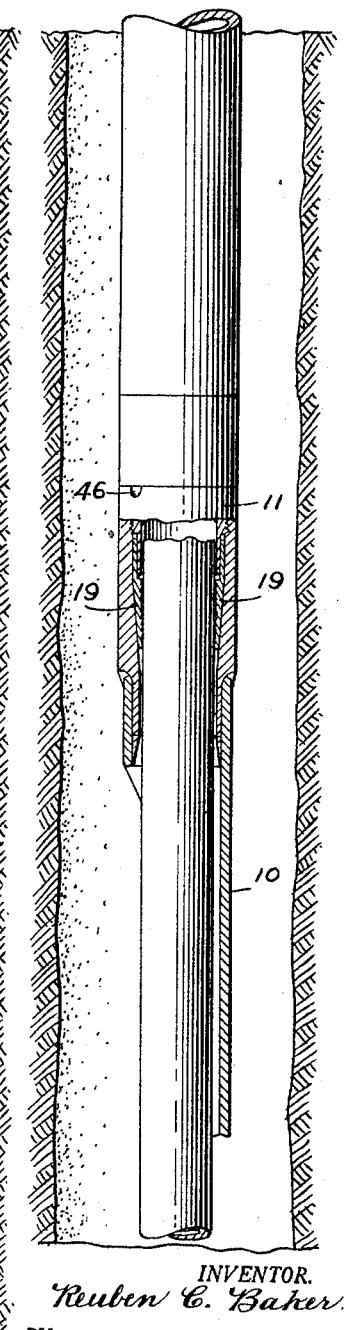
INVENTOR.
Reuben C. Baker
BY
Townsend, Loftus & Abbett
ATTORNEYS.

Dec. 10, 1929.   R. C. BAKER   1,738,937
COMBINATION FISHING TOOL
Filed April 18, 1928   4 Sheets-Sheet 2

INVENTOR.
Reuben C. Baker.
BY Townsend, Loftus & Abbett
ATTORNEYS.

Dec. 10, 1929.  R. C. BAKER  1,738,937
COMBINATION FISHING TOOL
Filed April 18, 1928  4 Sheets-Sheet 3
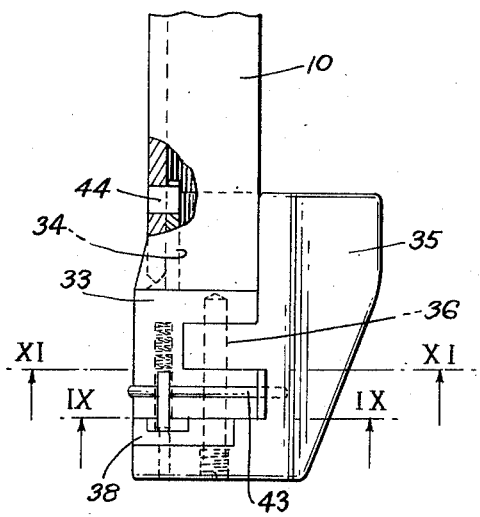
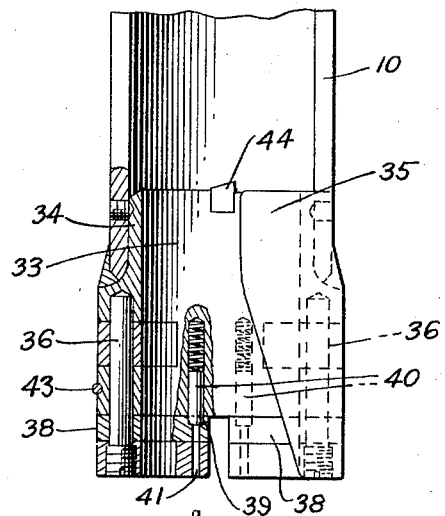
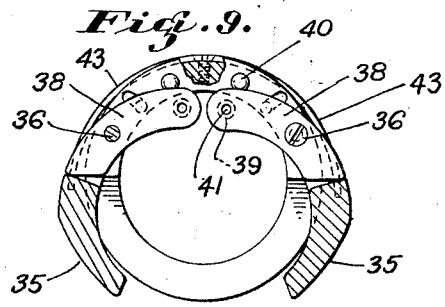
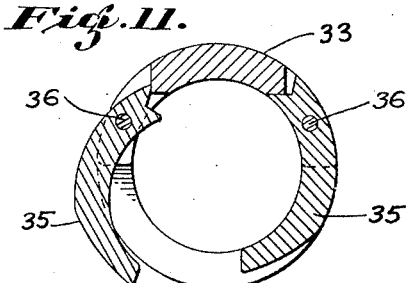
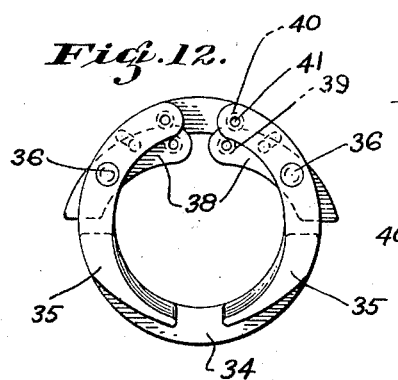
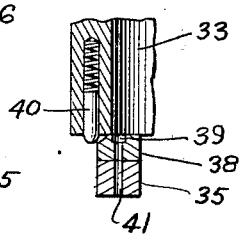
INVENTOR.
Reuben C. Baker
BY
Townsend, Loftus & Hackett
ATTORNEYS.

Dec. 10, 1929.                R. C. BAKER                1,738,937
                        COMBINATION FISHING TOOL
                        Filed April 18, 1928          4 Sheets-Sheet 4
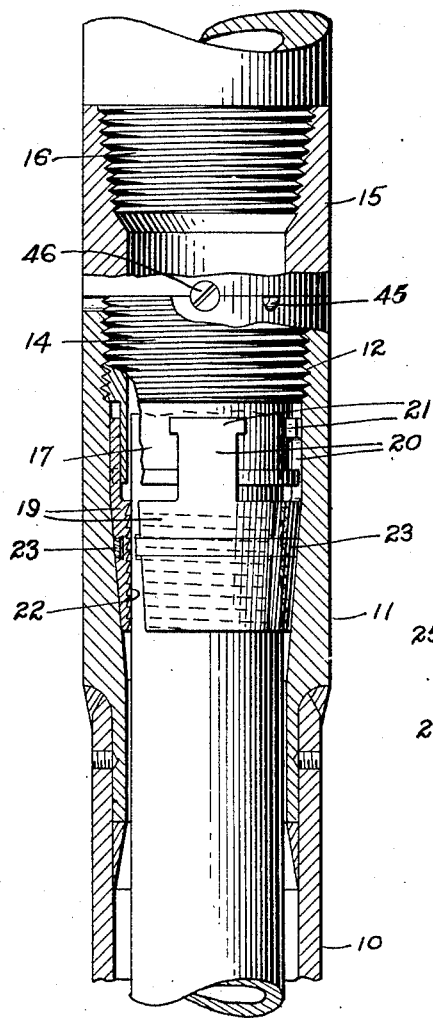
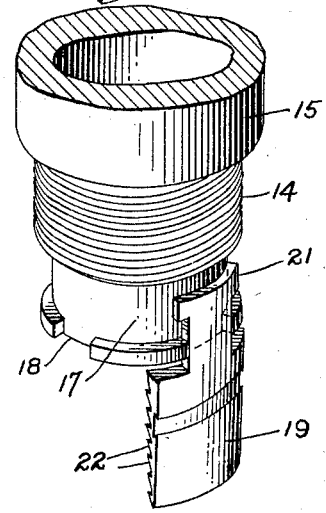
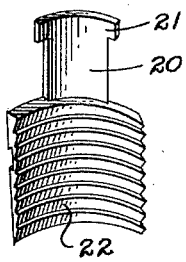
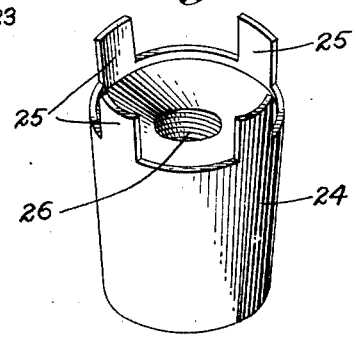
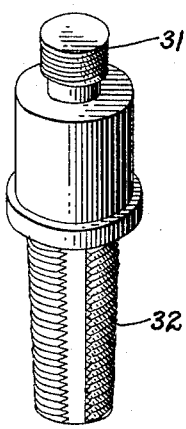
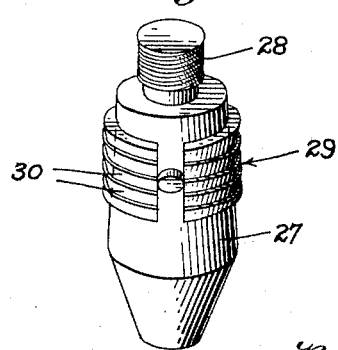
INVENTOR.
Reuben C. Baker
BY
Townsend, Loftus & Abbott
ATTORNEYS.

Patented Dec. 10, 1929

1,738,937

UNITED STATES PATENT OFFICE

REUBEN C. BAKER, OF COALINGA, CALIFORNIA, ASSIGNOR TO BAKER OIL TOOLS, INC., A CORPORATION OF CALIFORNIA

COMBINATION FISHING TOOL

Application filed April 18, 1928. Serial No. 270,832.

This invention relates to oil well drilling equipment and particularly pertains to a fishing tool for removing objects from a well.

It is the principal object of the present invention to provide a generally improved fishing tool capable of use under various circumstances to grip a broken off pipe in a well and remove it from the well, said fishing tool, however, being capable of being disengaged from a pipe gripped thereby in the event that it is impossible to elevate the pipe.

In carrying out this object into practice, I provide an elongated semi-cylindrical body having an overshot body at its upper end which may be connected to the lower end of an offset device or a fishing string. The lower end of the semi-cylindrical body is fitted with a pair of normally open hinged jaws adapted to be closed by engagement with a pipe to embrace the same. After the pipe is embraced by the jaws, the tool is manipulated to cause the end of the pipe to be inserted within the overshot body. Means are provided within this body for gripping the pipe so that it may be elevated in unison with the tool. This means, however, is capable of being released from the pipe by rotating the tool relative to the pipe.

One form which the invention may assume is exemplified in the following description and illustrated by way of example in the accompanying drawings in which:

Fig. 1 is a view in elevation of my improved fishing tool shown in a well and engaging a pipe therein.

Fig. 2 is a similar view showing the operation of drawing the pipe to the center of the well so that it may be aligned with the overshot body of the tool.

Fig. 3 is a view of the tool in section showing the pipe projected within the overshot body and engaged by the slips.

Figs. 7 and 8 are views in elevation of the jaws at the lower end of the fishing tool with parts in section to more clearly disclose their construction.

Fig. 9 is a view in section through the jaws taken on line IX—IX of Fig. 7.

Fig. 10 is a view of the device used to disengage the latch pins of the jaws.

Fig. 11 is a view in transverse section through the jaws taken on line XI—XI of Fig. 7.

Fig. 12 is a bottom view of the jaws with the jaws in closed position but with the latches in position permitting the jaws to swing freely.

Fig. 13 is a fragmentary view in vertical section through one of the latch members and the jaw holder showing the manner in which the latch pins engage the latch members.

Fig. 14 is an enlarged central section through the overshot body showing the arrangement of the pipe gripping slips therein.

Fig. 15 is a fragmentary view in perspective disclosing the sub and the manner in which the slips are connected thereto.

Fig. 16 is a view in perspective of one of the slips.

Fig. 17 is a perspective view of the head member used in connection with the overshot body under certain conditions.

Fig. 18 is a perspective view of a tap adapted to be connected with the head member shown in the preceding figure.

Fig. 19 is a perspective view of a spear used under certain circumstances to connect the overshot body with a pipe.

Figure 4:
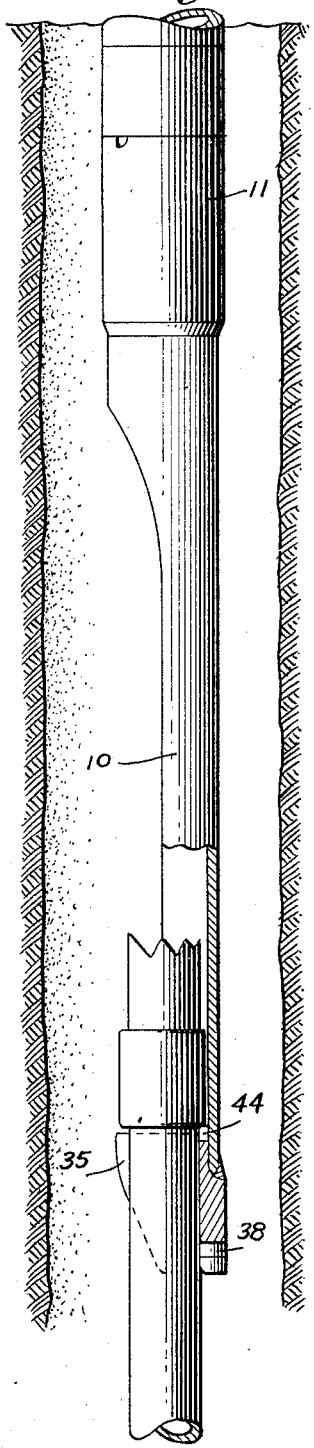
Fig. 4 is a view in elevation of the fishing tool shown in a well and with its jaws embracing a pipe just below a coupling.

Referring more particularly to the accompanying drawings 10 indicates an elongated semi-cylindrical tube having a hollow cylindrical overshot body 11 rigidly secured thereto at its upper end. The upper extremity of the overshot body 11 is interiorly threaded as at 12 to engage a threaded portion 14 on an upper sub 15 to firmly connect the two elements together. The sub 15 is interiorly threaded as at 16 so that it may be connected with the lower end of a fishing string or to the lower end of an offset device to suspend and operate the fishing tool here disclosed in a well. The lower end of the upper sub 15 is reduced in diameter so that it may telescope within the overshot body 11, as illustrated in Fig. 14 of the drawings. This reduced end of the sub is formed with a circumscribing channel 17. Radially spaced slots 18 are formed at equally spaced distances apart around the lower end of the sub and extend from the channel to the lower extremity of the sub as illustrated in Figs. 14 and 15.

Arranged within the overshot body and connected to the lower end of the sub is means for engaging a pipe projected within the overshot body. In the present instance I have shown three types of devices for this purpose which are used under different circumstances so that the fishing tool here disclosed is adapted to cope with various conditions encountered when fishing.

One of these devices is most clearly illustrated in Figs. 14 to 16 inclusive and comprises a plurality of segmental slips 19 which are arranged around the inner periphery of the overshot body just below the end of the sub 15. Each slip 19 is formed with a flat stem 20 projecting centrally from its upper end and slidably engaging one of the slots 18. This stem 20 is formed with an enlarged upper end 21 which cannot pass through the slot engaged by the stem. The stems 20 of the slips 19 are loosely confined in the slots 18 and channel 17 between the sub and the bore of the overshot body 11. This mounting of the slips permits them under certain circumstances a limited amount of longitudinal reciprocation.

A portion of the bore of the overshot body 11 is tapered and the outer faces of the slips 19 are tapered to coincide with said bore. These tapered faces co-act to contract the slips upon relative longitudinal movement between the overshot body 11 and the slips in one direction to cause the slips to tightly grip a pipe or other member extending into the overshot body through the slips.

The inner faces of the slips 19 are formed with helical wickers 22 which are led in a left-hand direction. As all of the other joints of the fishing string and the parts of the fishing tool are connected by right-hand threads, rotation of the string and tool in a direction preventing the disengagement of these joints will unthread the slips from a pipe gripped thereby. The slips are yieldably held contracted together by a spring 23.

When a pipe is inserted upwardly into the overshot body the slips will yieldably expand and frictionally engage the pipe. When the overshot body is moved upwardly relative to the pipe the slips will remain stationary relative to the pipe during the commencement of the movement of the overshot body, so that the tapered surfaces between the slips and the overshot body will cause the slips to contract toward each other and tightly grip the pipe. It is obvious that the more strain imposed to break this joint the more tightly the slips will grip the pipe.

In lieu of the slips, circumstances may require or I may prefer to use what is termed a spear for connecting the overshot body with a pipe. This spear is most clearly illustrated in Figs. 17 and 19 of the drawings, and comprises a head 24 which is tapered and adapted to snugly nest in the tapered portion of the bore in the overshot body. The upper end of this head 24 is formed with upwardly projecting stems 25 adapted to engage with the slots 18 at the lower end of the sub 15 to prevent relative rotation between the head 24 and the overshot body.

The head 24 is formed with a centrally located tapped hole 26. Threadedly connected to this opening 26 is a spear head 27 having a reduced shank 28 which is exteriorly threaded to engage the tapped hole 26 in the head 24. The spear head 27 is tapered and a split slip ring 29 is slidably but non-rotatably mounted thereon. The inner surface of this slip ring 29 is tapered to correspond with the taper of the spear head 27, so that longitudinal movement of the slip ring 29 on the spear head will expand and contract the slip ring. The outer surface of the slip ring is formed with helical wickers 30 led in a left-hand direction. The lower extremity of the spear head 27 is pointed to engage the open upper end of a pipe projecting within the overshot body.

In such case the slip ring 29 frictionally engages the interior surface of the pipe and when the overshot body is elevated relative to the pipe, the slip ring is drawn downwardly on the spear head and expanded to tightly grip the pipe and connect it with the overshot body. If it is desired to release the pipe it is merely necessary to revolve the overshot body in a direction tending to maintain all of the joints in the string tight, thus causing the left-hand wickers of the slip ring 29 to unthread from the pipe.

I may also prefer to use a tap under certain conditions such as illustrated in Fig. 18. This tap is provided with a threaded shank 31 which may threadedly engage the tapped hole 26 in the head 24. This tap has a fluted flat cutting shank 32 which is tapered. This tap is adapted to engage an opening in a tool joint or other element and by revolving the overshot body the tap will form its own threads and connect the two elements.

The present tool also includes means for engaging a pipe in a well and drawing it to position enabling the overshot body to be telescoped thereover. This means is arranged at the lower end of the semi-cylindrical tube 10 and comprises a semi-cylindrical jaw holder 33 suitably secured to the lower end of the semi-cylindrical tube 10 in axial alignment therewith and with the overshot body. This jaw holder 33 has a semi-cylindrical extension 34 telescoping upwardly within the end of the semi-cylindrical tube member 10.

A pair of arcuate jaw members 35 are hinged to the jaw holder 33 by means of hinge pins 36 which are removable so that the parts may be disassembled. The jaws 35 are in axial alignment with the jaw holder 33 and the semi-cylindrical tube 10 and when in closed position are arranged about the same center as these latter.

The inner ends or portions of the jaws are adapted to project within the circumference of the jaw holder 33 when the jaws are in open position. The swinging movement of the jaws both outwardly and inwardly is limited by engagement of the jaws with jaw holder as illustrated in Fig. 11.

Formed in the same arc as the jaws and hinged to the hinge pins 36 within a recess formed in the jaws between the latter and the lower end of the jaw holder 33 is a pair of latch members 38. These latch members are each formed with a socket 39 adapted to be engaged by a spring-pressed latch pin 40 when the latches 38 are in alignment with the end of the jaw holder 33.

When the latches 38, the jaws 35 and the jaw holder 33 are in alignment, the latch pins 40 will engage the sockets 39 and latch the latches 38 in position. The outer ends of the latter will engage the ends of the recesses in the jaws 35 and prevent the latter from being opened. To release these latch pins 40, passageways 41 are provided through which a tool 42 may be projected to disengage the pins 40 from the sockets 39 so that the jaws and latches may be moved to open position.

When in open position the inner ends of the latches 38 and the jaws 35 project within the circumference of the jaw holder. In this position the jaws may freely open and close without affecting the latches. The jaws are normally maintained open by means of a spring 43.

When the jaws 35 are in open position and engaged with the pipe, the pipe abuts against the inner ends of the jaws and latches and moves them into alignment with the end of the jaw holder 33. The pins 40 then engage the sockets 39 and latch the jaws in closed position, embracing the pipe. The jaws cannot open then until a tool 42 is inserted through the passageway 41 to disengage the pins 40 from the sockets 39. After embracing the pipe the tool may be manipulated to align the pipe with the overshot body 11, so that the latter may be arranged thereover to connect it to the tool as previously described.

In the event that the jaws grip a pipe just below a coupling as illustrated in Fig. 4, the lower end of the coupling will abut on the annular shoulder presented by the upper end of the jaw holder 33. This abutment will enable the tool to be elevated and thereby elevate the pipe embraced by the jaws. However, if for any reason the pipe gripped by the jaws cannot be elevated, the entire tool and jaws may be revolved to cut away the coupling until it is released from the pipe. This is accomplished by providing a cutting tool 44 projecting upwardly from the annular shoulder presented by the upper end of the jaw holder 33.

It is obvious that upon relative rotation between the jaw holder and the coupling that the tool will cut away the coupling until the latter frees itself from the main body of the pipe.

In operation of the device it may be assembled on the lower end of a fishing string or at the end of an offset tool or other device for proper operation in a well. The manner in which the tool is used, of course, depends entirely upon conditions, the nature of the object to be fished and the skill of the operator.

It is seen that the sub 15 may be connected to any suitable device for operating the tool in a well. If it is connected to an offset the device may be used to grab broken off pipe in a cave-in or in the side of the well wall.

In order that the jaws may be properly aligned with the offset, when the tool is used in connection therewith the contiguous faces between the sub 15 and the overshot body 11 are formed with notches 45 so that a screw 46 may be used to prevent relative rotation and disconnection between these two parts after the jaws have been properly aligned with the offset.

After the tool has been properly assembled on the fishing string or on the end of an offset, it is operated in a well until the jaws embrace a pipe as indicated in Fig. 1. The engagement of the inner ends of the jaws and latch members 35 and 38 with the pipe will cause the jaws to close and be latched in closed position. If the device is used in connection with an offset, the offset is then straightened to draw the pipe to the center of the well and the string may be elevated to arrange the pipe in axial alignment with the string.

Figure 5:
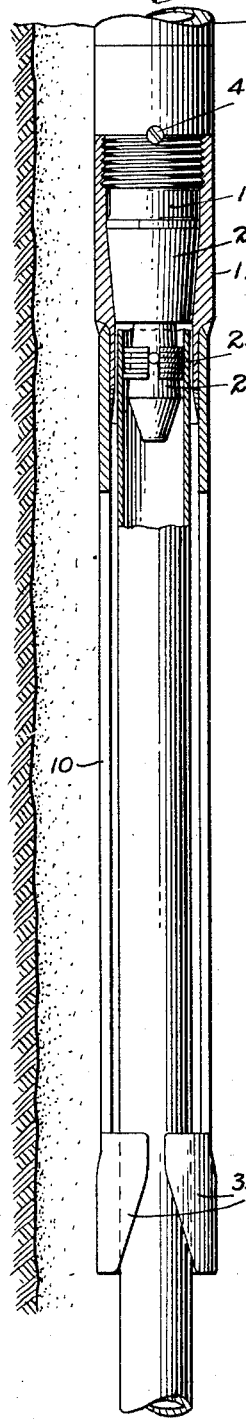
Fig. 5 is a view of the fishing tool in a well with parts thereof in section showing the use of a spear for engaging the pipe.

After properly positioning the pipe, the tool is lowered until the end of the pipe is projected within the overshot body where it will be gripped by a device such as indicated in Figs. 3 or 5. After the pipe is gripped by the overshot body, the tool is elevated and the pipe will be connected thereto and will be simultaneously elevated therewith and thus removed from the well.

In the event that the pipe grasped by the fishing tool is stuck so tightly in the hole that it cannot be elevated, the tool is rotated to cause the slips to release from the pipe in order that the fishing string may be removed from the hole.

In the event that the jaws close around the pipe below a coupling, the end of the coupling will abut on the upper end of the jaw holder 33 to form a connection between the tool and the pipe to be elevated, so that the latter may be pulled directly from the well. Under these circumstances should the pipe be tightly stuck in the hole, the fishing string may be released therefrom by merely revolving the fishing tool and cutting away the coupling until it parts from the pipe. The fishing tool may then be removed from the well.

Figure 6:
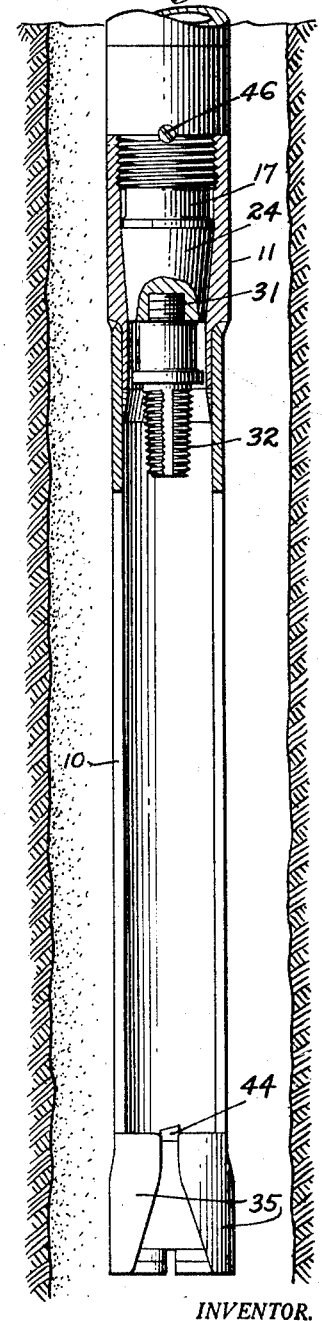
Fig. 6 is a similar view showing the use of a tap for connecting the fishing tool to an element being fished.

Under some circumstances, it is desired to use a tap such as illustrated in Figs. 6 and 8. This tool is operated to engage an opening in a tool joint or other device and the string is rotated in a direction causing the tap to cut its own threads and thus connect the fishing tool to the device being fished.

From the foregoing it is obvious that I have provided a very efficient tool which may be used under various circumstances to fish drill pipe from a well, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An overshot body comprising a hollow section adapted to be telescoped over a cylindrical member, vertically reciprocable slips mounted within the hollow section and adapted to permit the hollow section to be telescoped over a cylindrical member, means limiting the reciprocable movement of the slips, means causing said slips to contract about a cylindrical member therein when an attempt is made to withdraw the hollow section from the cylindrical member and thereby tightly grip the member and connect it to the overshot body, said slips having left-hand wickers formed on their interior surfaces for engaging the surface of the cylindrical member whereby the member may be released by proper relative rotation between the slips and cylindrical member.

2. A device of the character described comprising a member adapted to be connected with the lower end of a fishing string, a pair of arcuate jaws hinged at the bottom of said member and adapted when closed to embrace a pipe, means normally tending to maintain said members in open position, means whereby engagement of a pipe with the inner portions of said jaws will cause the jaws to close, and latch means for latching said jaws closed.

3. A device of the character described comprising a member adapted to be secured at the lower end of a fishing string, a pair of substantially semi-cylindrical jaws hinged at the bottom of said member and normally disposed in open position, said jaws being adapted to be moved to and latched in closed position by engagement of an object with the inner portions of the jaws.

4. A device of the character described comprising a member adapted to be secured at the lower end of a fishing string, a pair of substantially semi-cylindrical jaws hinged at the bottom of said member in axial alignment therewith to swing in a plane at right angles to said member, said jaws being adapted to be moved to closed position by engagement of an object with the inner portions of said jaws, latch means operative by said engagement to latch the jaws in closed position.

5. A device of the character described comprising a member adapted to be fixed at the lower end of a fishing string, a pair of substantially semi-cylindrical jaws hinged at the bottom of said member in axial alignment therewith, said jaws being normally free to swing about their hinged points, spring means tending to hold the jaws in open position, said jaws being adapted to be moved to closed position by engagement of an object with the inner portions of the jaws, latch means unaffected by the movement of the jaws but adapted to be operated by the object engaging the inner portions of the jaws and moving them to closed position to latch the jaws in closed position.

6. A device of the character described comprising a member adapted to be connected with the lower end of a fishing string a pair of arcuate jaws hinged at the bottom of said member and adapted when closed to embrace a pipe, means normally tending to maintain said members in open position, means whereby engagement of a pipe with the inner portions of said jaws will cause the jaws to close, and latch means for latching said jaws closed, an abutment at the top of the jaws to abut against the lower end of a collar on a pipe embraced by the jaws to permit the jaws to elevate the pipe.

7. A device of the character described comprising a member adapted to be fixed at the lower end of a fishing string, a pair of substantially semi-cylindrical jaws hinged at the bottom of said member in axial alignment therewith, said jaws being normally free to swing about their hinged points, spring means tending to hold the jaws in open position, said jaws being adapted to be moved to closed position by engagement of an object with the inner portions of the jaws, latch means unaffected by the movement of the jaws but adapted to be operated by the object engaging the inner portions of the jaws and moving them to closed position to latch the jaws in closed position, an annular shoulder at the top of the jaws to engage the lower end of a collar on a pipe enclosed in the jaws to permit the jaws to elevate the pipe.

8. A device of the character described comprising a member adapted to be connected with the lower end of a fishing string, a pair of arcuate jaws hinged at the bottom of said member and adapted when closed to embrace a pipe, means normally tending to maintain said members in open position, means whereby engagement of a pipe with the inner portions of said jaws will cause the jaws to close, and latch means for latching said jaws closed, an abutment at the top of the jaws to abut against the lower end of a collar on a pipe embraced by the jaws to permit the jaws to elevate the pipe, and means at said abutment at the top of the jaws for cutting away the collar by rotation of the jaws relative to the collar.

9. A device of the character described comprising a member adapted to be fixed at the lower end of a fishing string, a pair of substantially semi-cylindrical jaws hinged at the bottom of said member in axial alignment therewith, said jaws being normally free to swing about their hinged points, spring means tending to hold the jaws in open position, said jaws being adapted to be moved to closed position by engagement of an object with the inner portions of the jaws, latch means unaffected by the movement of the jaws but adapted to be operated by the object engaging the inner portions of the jaws and moving them to closed position to latch the jaws in closed position, an annular shoulder at the top of the jaws to engage the lower end of a collar on a pipe enclosed in the jaws to permit the jaws to elevate the pipe, and means at said annular shoulder for cutting away the collar by rotation of the jaws relative to the collar.

10. A device of the character described comprising a semi-cylindrical body adapted to be secured at the lower end of a fishing string, a pair of arcuate jaws hinged at the lower end of said body in axial alignment therewith and adapted to swing in a plane at right angles to the axis of the body, means tending to maintain said jaws open, said jaws being adapted to be moved to closed position and latched by engagement of a pipe with the inner portions of the jaws, an overshot body at the upper end of said body, and means within the overshot body to engage a pipe and connect it with said body.

11. A device of the character described comprising a semi-cylindrical body adapted to be secured at the lower end of a fishing string, a pair of arcuate jaws hinged at the lower end of said body in axial alignment therewith and adapted to swing in a plane at right angles to the axis of the body, means tending to maintain said jaws open, said jaws being adapted to be moved to closed position and latched by engagement of a pipe with the inner portions of the jaws, an overshot body at the upper end of said body, and means within the overshot body to engage a pipe and connect it with said body, said means being adapted to release said pipe upon rotation of the body relative to the pipe.

REUBEN C. BAKER.